US012234975B2

(12) United States Patent
Ni

(10) Patent No.: US 12,234,975 B2
(45) Date of Patent: Feb. 25, 2025

(54) DIMMER LIGHT SWITCH WITH VERTICAL SLIDER CONTROL FOR LIGHTING ADJUSTMENTS AND MANUAL ON/OFF POWER SWITCH

(71) Applicant: Enerlites Inc., Irvine, CA (US)

(72) Inventor: Lidong Ni, Zhejiang (CN)

(73) Assignee: Enerlites Inc., Irvine, CA (US)

( * ) Notice: Subject to any disclaimer, the term of this patent is extended or adjusted under 35 U.S.C. 154(b) by 544 days.

(21) Appl. No.: 17/500,083

(22) Filed: Oct. 13, 2021

(65) Prior Publication Data

US 2022/0205623 A1 Jun. 30, 2022

(30) Foreign Application Priority Data

Dec. 24, 2020 (CN) ......................... 202023194440.5

(51) Int. Cl.

*H01H 23/04* (2006.01)
*F21V 23/04* (2006.01)
*H01H 15/00* (2006.01)
*H01H 15/10* (2006.01)
*H01H 23/16* (2006.01)

(52) U.S. Cl.

CPC ........... *F21V 23/04* (2013.01); *H01H 15/005* (2013.01); *H01H 15/102* (2013.01); *H01H 23/04* (2013.01); *H01H 23/16* (2013.01)

(58) Field of Classification Search

CPC .... F21V 23/04; H01H 15/005; H01H 15/102; H01H 23/04; H01H 23/16; H01H 23/14; H01H 23/006

See application file for complete search history.

(56) References Cited

U.S. PATENT DOCUMENTS

2013/0293137 A1* 11/2013 Jennings ................ H05B 47/10 315/224
2014/0300275 A1* 10/2014 Altonen ............... H01H 13/023 315/130
2017/0322584 A1* 11/2017 LiVolsi .................... G05G 1/12

* cited by examiner

*Primary Examiner* — Ahmed M Saeed
(74) *Attorney, Agent, or Firm* — Ziegler IP Law Group, LLC.

(57) ABSTRACT

A dimmer switch, which is comprised of a shell, which has a circuit board and a dial button for controlling the ON/OFF state of the switch, a first regulating structure and a second regulating structure, the first regulating structure is arranged on the shell, which has a first potentiometer connected to a circuit board, and a push button for adjusting the resistor of the first potentiometer to rough adjust the illumination intensity, the push button moves reciprocate along the shell to drive the first potentiometer; the second regulating structure is located on the shell, which has a second potentiometer connected to a circuit board, and a rotary knob for adjusting the resistor of the second potentiometer to fine-tune the illumination intensity, the rotary knob drives the second potentiometer to rotate, the dimmer switch can coarse adjust the illumination intensity through the push button, and also fine-tune the illumination intensity through the knob on the basis of the coarse adjustment, making it easy for the user to accurately adjust the light to a specific brightness.

10 Claims, 4 Drawing Sheets

DIMMER LIGHT SWITCH WITH VERTICAL SLIDER CONTROL FOR LIGHTING ADJUSTMENTS AND MANUAL ON/OFF POWER SWITCH

TECHNICAL FIELD

The aspects of the disclosed embodiments relate to the switch technical field, particularly to a dimmer switch.

BACKGROUND TECHNOLOGY

The dimmer switch is used to adjust the illumination intensity of a light and it is often seen in our daily lives. The shell of the dimmer switch provides a button that is used to adjust the intensity of illumination. Presently, users can only coarsely adjust illumination intensity by using the button, which makes it difficult for the user to accurately adjust to a specific lighting level and it is not convenient.

SUMMARY

Therefore, the technical problem to be solved by the aspects of the disclosed embodiments is to overcome the existing technology defect in the lack of accuracy in adjusting lighting intensity, so as to provide a dimmer switch that can more accurately adjust the level of illumination intensity.

For this purpose, the aspects of the disclosed embodiments provide a dimmer switch, which is comprised of a shell, a first regulating structure and a second regulating structure. The shell has a circuit board and a dial button for controlling the ON/OFF state of the switch; the first regulating structure is located on the shell, which includes a first potentiometer connected with the circuit board, and the resistor used for regulating the first potentiometer, a push button for coarse adjustment of illumination intensity, the push button moves reciprocate along the shell to drive the first potentiometer action; the second regulating structure is located on the shell and has the second potentiometer connected with circuit board, and a resistor used for regulating the second potentiometer, a rotary knob for coarse adjustment of illumination intensity, the rotary knob moves reciprocate along the shell to drive the second potentiometer action.

The push button is connected to the shell through a sliding rail structure, the sliding rail structure is comprised of a slide groove arranged on the inner surface of the side plate of the shell and at least one slide block located on one side of the push button that can be connected with the slide groove.

There are two bulges located on either side along the width of the push button bottom surface, which extend toward the upper cover of the shell and slide to contact with the upper cover.

The knob is comprised of a tooth-shaped piece arranged on the upper part and the lower connecting rod, which can connect with the mounting hole set of the second potentiometer.

The cross-section of the connecting rod is hexagonal and the shape of the mounting hole is a matching hexagon.

Part of the tooth-shape is exposed outside of the shell.

The outer wall of the shell is provided with a baffle plate located below the tooth-shape part, and its edge is beyond the outer contour of the tooth-shape part.

The shell has an indicator mark corresponding to the push button and knob to adjust the illumination intensity.

The technical proposal of the present disclosure has the following advantages:

1. The dimmer switch provided by this utility model, including the shell, which includes the circuit boards and dial button used to control the switch ON/OFF state, the first regulating structure and the second regulating structure, the first regulating structure is arranged on the shell, and includes the first potentiometer connected to a circuit board, and the push button for adjusting the resistor of the first potentiometer to rough tune the illumination intensity, the push button moves reciprocate along the shell, to drive the first potentiometer action; the second regulating structure is arranged on the shell, and includes the second potentiometer connected to a circuit board, and the rotary knob for adjusting the resistor of the second potentiometer to rough tune the illumination intensity. The rotary knob drives the second potentiometer to rotate, the dimmer switch can use the push button for coarse tuning the illumination intensity, and also use the knob to further fine-tune the illumination intensity based on the coarse tuning, so that it is convenient for users to adjust to specific lighting intensity levels accurately.
2. The push button of this dimmer switch provided by the utility model slides to connect with the shell through a sliding rail structure, the slide rail structure is comprised of a slide groove arranged on the inner surface of the side plate of the shell, and at least one slide block arranged on one side of the push button and can connect with the slide groove, the sliding rail structure can greatly reduce the friction between the push button and the shell in the operation of the dimmer switch, and the structure of the sliding chute and the sliding block is simple.
3. There are two bulges located on either side of the dimmer switch provided by the utility model, along the width of the bottom of the push button, and they extend toward the direction of the upper cover of the shell and slide into contact with the upper cover. In this way, the bulges can reduce the contact area between the bottom of the push button and the upper cover of the shell, thereby reducing the friction between the two, so as to facilitate the push of the button.
4. In the dimming switch provided by the utility model, the knob is comprised of a toothed piece arranged on the upper part and the connecting rod arranged on the lower part, which connects with the mounting hole set of the second potentiometer, the toothed parts are easy for users to rotate by hand.
5. On the dimming switch provided by the utility model, the outer wall of the shell provides a baffle plate located below the toothed piece, and its edge extends beyond the outer contour of the toothed piece. This can prevent the user from inadvertently touching the tooth-shape parts, which could result in faulted operation. In addition, the baffle avoids abrasion with the tooth-shape parts within packaging throughout transport, thus improving the reliability.

BRIEF DESCRIPTION OF THE DRAWINGS

To more clearly state the specific implementation mode of the present disclosure or the technical scheme in the prior art, the following will briefly describe the specific implementation or images that may be required in prior art descriptions. It is clear that the attached images described below are just some implementations of the utility model, for the general technicians in this field, they can obtain other images according to provided images without any creative effort.

Attached images description: 1. Shell; 11. Circuit board; 12. Twist; 13. Chute; 2, First Potentiometer 3, Push Button; 31. Slider; 32. Bulge; 4. Second Potentiometer; 41. Mounting Hole; 5. Knob; 51. Tooth-Shape Parts; 52. Connecting Rod; 6. Baffle; 7. Indicating Marks

DETAILED DESCRIPTION OF EMBODIMENTS

The following will give a clear and complete description of the technical scheme of the present disclosure. The described embodiments are part of the embodiments of the present disclosure but not all of them. Based on the embodiments of the present disclosure, all the other embodiments obtained by the general technicians in the field without doing creative work will all belong to the present disclosure protection scope.

In the description of the aspects of the disclosed embodiments, it must be stated that, the terms "center," "up," "down," "left," "right," "vertical," "horizontal," "inside," "outside," and other indications of orientation or position relations are all based on the orientation or position of relations in the attached images, the only purpose is to describe the utility model easily instead of indicating or implying that the referred device or element must have a particular orientation or be constructed and operated in a particular direction. Therefore, it cannot be understood as a limitation of the utility model. Furthermore, the terms "first," " "second," and "third," are used only for descriptive purpose and cannot be understood to indicate or imply relative importance.

In the description of the aspects of the disclosed embodiments, it must be stated that, unless otherwise expressly stipulated and limited, the terms "install," "link," "connect," should be used in a broad sense. For example: it can be fixed connection, removable connection, or one connection; it can be a mechanical connection or an electrical connection; it can be directly connected, or indirectly connected through an intermediary, or the internal connection of two components. For general technicians in this field, they can understand the specific meaning of the above terms of this utility model in specific circumstances.

In addition, the technical characteristics involved in the different embodiments of the present disclosure described below may be combined with each other as long as they do not constitute a conflict with each other.

EMBODIMENT

Figure 1:
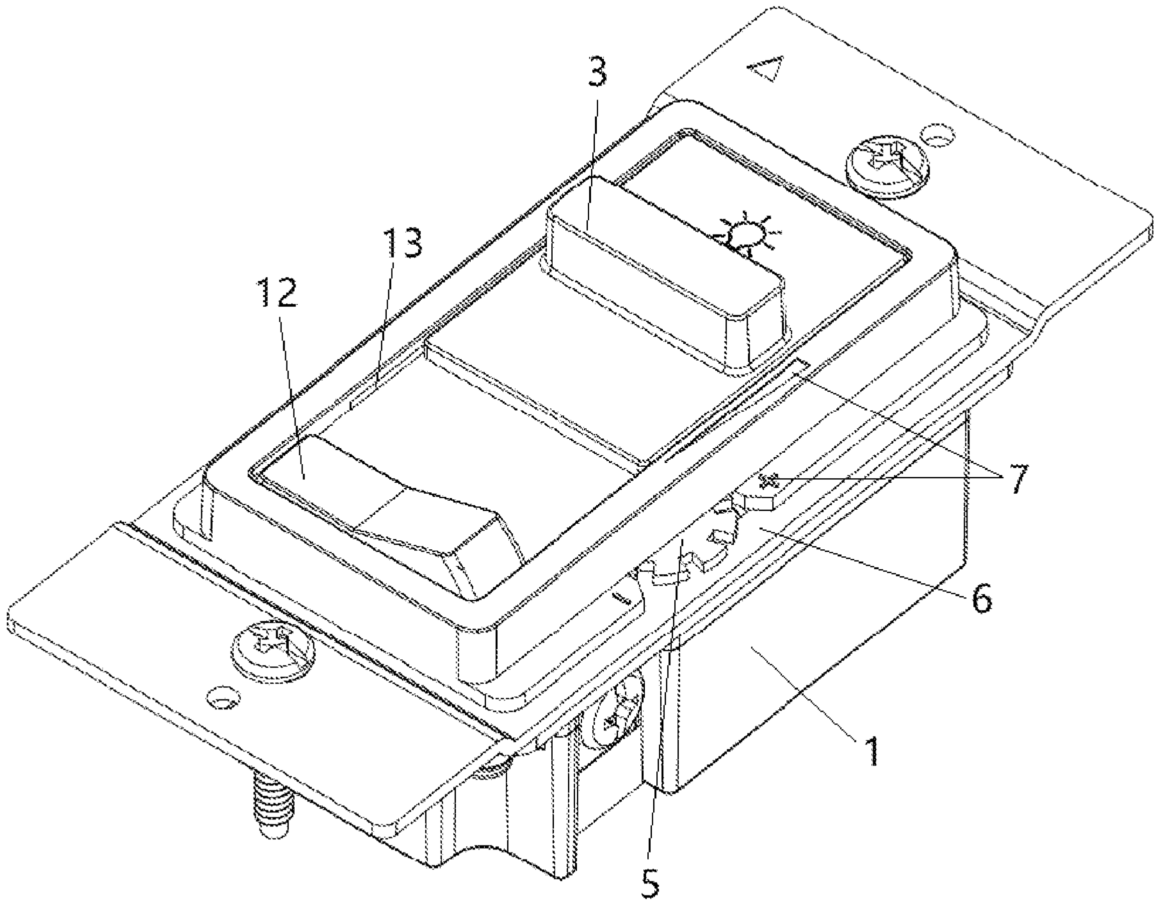
FIG. 1 The stereogram of the dimmer switch of the utility model.

This embodiment provides a dimmer switch, as shown in FIG. 1, comprising a shell 1, a first regulating structure and second regulating structure.

Figure 2:
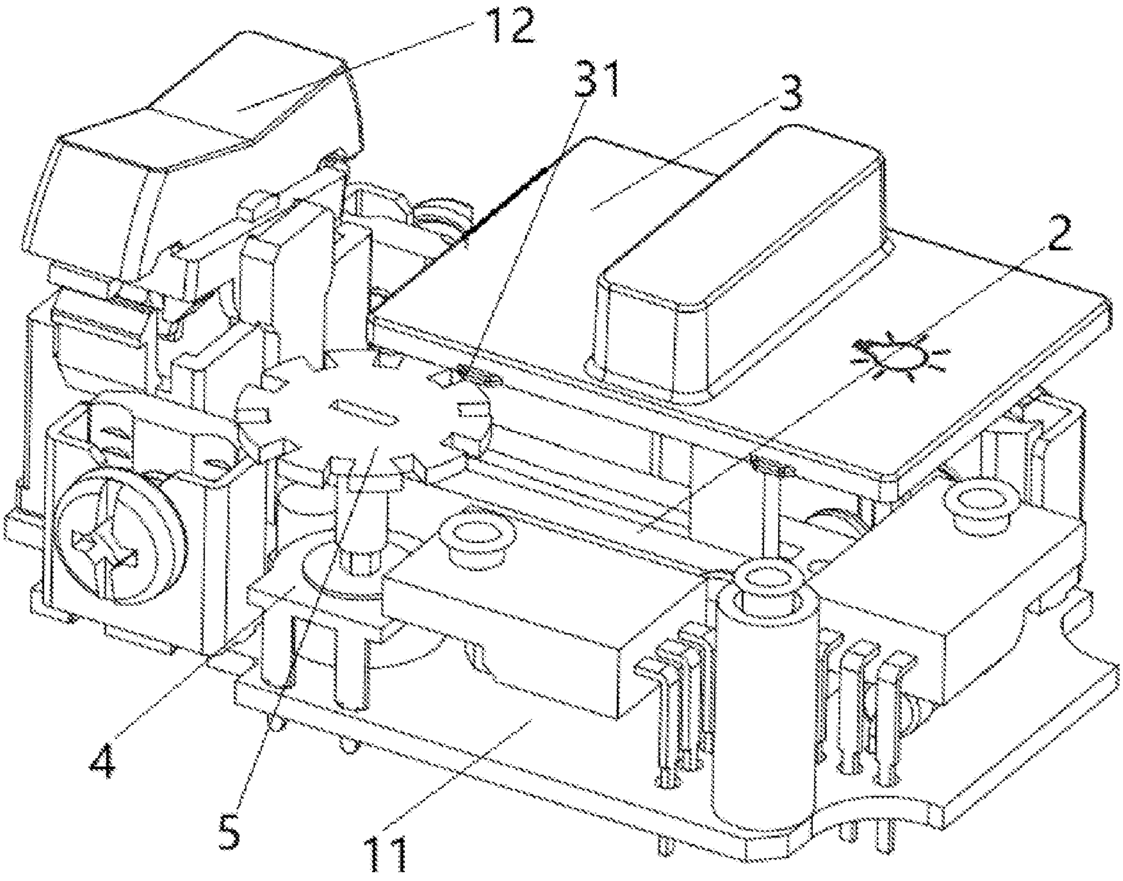
FIG. 2 The stereogram of FIG. 1 without the shell and baffle.
Figure 4:
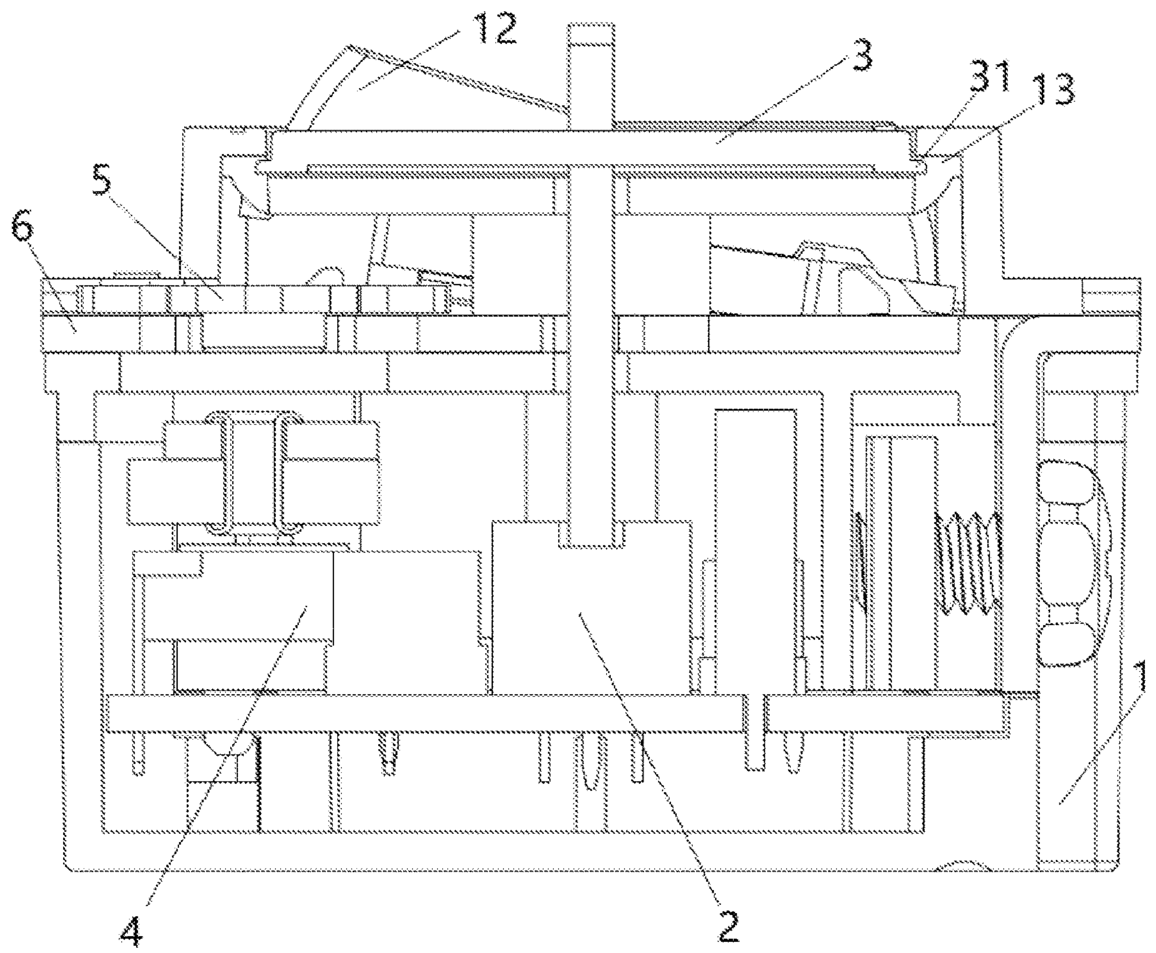
FIG. 4 The explosion structure diagram of the second regulating structure.
Figure 5:
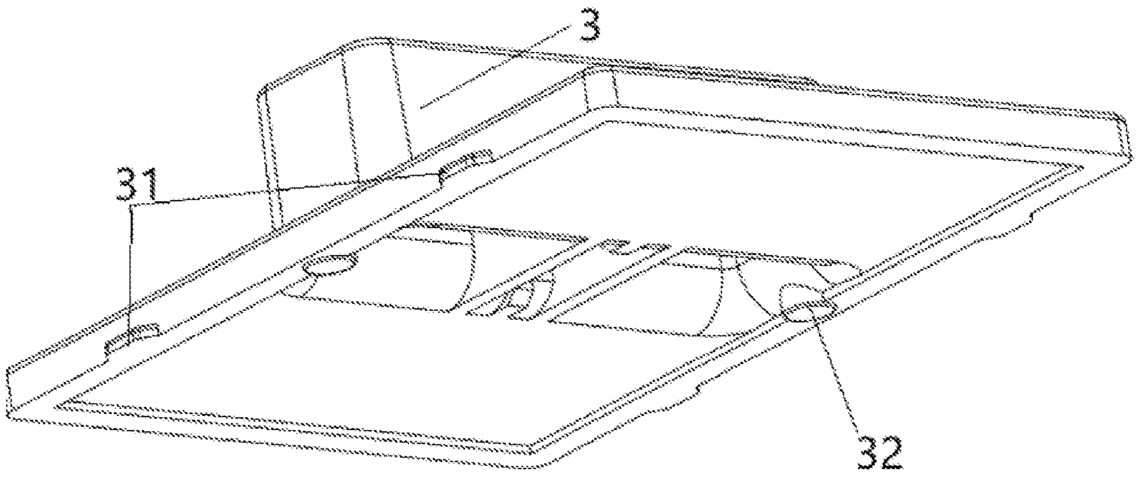
FIG. 5 The stereogram of the push button.

Shell 1, as shown in FIGS. 1, 2 and 4, has a circuit board 11 and the dial button 12 that used to control the ON/OFF state of the switch, the inner surface of the side plate of shell 1 locates a chute 13, and the outer wall of the shell 1 has the baffle 6 that located below the tooth-shape piece 51 and its edge exceeds the set outer contour of the tooth-shape piece 51, and shell 1 is provided with an indicator 7 for adjusting the illumination intensity corresponding to push button 3 and knob 5.

The first regulating structure is located on shell 1, as shown in FIGS. 1, 2, 4 and 5, and includes the first potentiometer 2 connected with the circuit board 11 and a push button 3 for adjusting the resistor of the first potentiometer 2 to rough adjust the illumination intensity. Push button 3 along shell 1, to drive the first potentiometer 2 to act. One side of push button 3 is provided with two slides 31 that can connect with the sliding chute, and there are two bulges 32 located on either side along its width of the bottom of push button 3 and they extend toward the direction of the upper cover of the shell and slide into contact with the upper cover.

Figure 3:
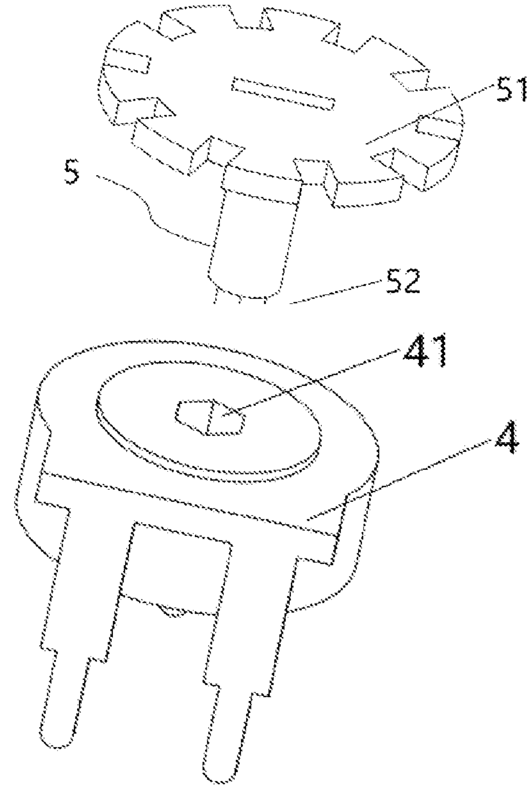
FIG. 3 The cross-section of FIG. 1.

The second regulating structure is located on shell 1, as shown in FIGS. 2 and 3, and includes the second potentiometer 4 connected with the circuit board 11 and a rotary knob 5 for adjusting the resistor of the second potentiometer 4 to rough adjust the illumination intensity. The rotary knob 5 drives the second potentiometer 2 to rotate. Knob 5 is comprised a tooth-shaped piece 51 arranged on the upper part, and a connecting rod 52 arranged below that can be connected with the 41 sets of mounting hole of the second potentiometer 4, the cross-section of the connecting rod 52 is hexagonal, and the shape of the mounting hole 41 is a matched hexagon, wherein, part of the tooth-shape 51 is exposed and arranged outside shell 1.

The dimmer switch provided by the present disclosure comprises of a shell 1, a first adjusting structure, and a second adjusting structure. Shell 1 has a circuit board 11 and a dial button 12 for controlling the on-off state of the switch. The first regulating structure is located on shell 1, and has the first potentiometer 2 that connects with the circuit board 11, and a push button 3 of adjusting the resistor of the first potentiometer to rough adjust the illumination intensity, the push button 3 moves reciprocate along shell 1 to drive the first potentiometer 2 to move; the second regulating structure is located on the shell 1 and has the second potentiometer 4 that connected with the circuit board 11, and a rotary knob 5 of adjusting the resistor of the second potentiometer 4 to rough adjust the illumination intensity. Knob 5 drives the second potentiometer 4 to rotate. The dimmer switch can adjust the illumination intensity by the push button 3, and also fine tunes the lighting intensity through the knob 5 based on the coarse tuning, so that it is easy for the user to accurately adjust the light to the desired brightness.

The above embodiments are only examples for clear description, rather than a restriction on implementation. For general technicians in the field, they can make other changes or variations based on the above description. It is unnecessary and impossible to list all implementations here, but the obvious changes or variations arising therefrom still belong to the protection scope of utility model creation.

What is claimed is:

1. A dimmer switch for a lighting device, the dimmer switch comprising:

a shell with a circuit board, and a first switch for controlling an ON/OFF state of the dimmer switch;

a first regulating structure located on the shell comprising a first potentiometer that connects with the circuit board, a button configured to coarse tune an illumination intensity of the lighting device, wherein the push button is configured to be pushed and slides to move an adjustment device in a reciprocating manner relative to the shell to drive an action of the first potentiometer;

a second regulating structure located on the shell, comprising a second potentiometer that connects with the circuit board and a rotary knob for adjusting a resistance of the second potentiometer to fine-tune the illumination intensity;

a sliding rail structure configured to slidingly couple the button with the shell, the sliding rail structure comprised of a slide groove disposed on an inner surface of a side plate of the shell, and at least one slider that is located on one side of the button, and is configured to be received in a corresponding channel in a sliding manner; and two bulges located along on both sides of a width of a bottom surface of the button, the two bulges being configured to extend toward an upper cover of the shell and slidingly connect with the upper cover.

2. The dimmer switch according to claim 1, wherein the rotary knob is comprised of a toothed-shaped piece located on an upper part of the rotary knob, and a connecting rod located below the upper part that is configured to connect with a mounting hole of the second potentiometer.

3. The dimmer switch according to claim 2, wherein a cross-section of the connecting rod is hexagonal and shape of the mounting hole is a matching hexagonal shape.

4. The dimmer switch according to claim 2, wherein a part of the tooth-shaped piece is exposed outside of the shell.

5. The dimmer switch according to claim 4, further comprising a baffle plate located on an outer wall of the shell, the baffle plate being located below the tooth-shaped piece, and having an edge that extends beyond an outer contour of the tooth-shaped piece.

6. The dimmer switch according to claim 1, further comprising at least one indicator mark on the shell, the at least one indicator mark being configured to guide an adjustment of the illumination intensity using one or more of the button and the knob.

7. A dimmer switch for adjusting an illumination intensity of a lighting device, wherein the dimmer switch comprises:

a first regulating structure comprising a first potentiometer configured for coarse adjustment of the illumination intensity;

a second regulating structure comprising a second potentiometer for fine adjustment of the illumination intensity; and a switch configured to regulate an ON/OFF switching of the dimmer switch;

a sliding rail structure configured to slidingly couple a button of the first regulating structure with a shell of the dimmer switch, the sliding rail structure comprised of a slide groove disposed on an inner surface of a side plate of the shell, and a slider that is located on one side of the button, and is configured to be received in a corresponding channel in a sliding manner; and two bulges located along on both sides of a width of a bottom surface of the button, the two bulges being configured to extend toward an upper cover of the shell and slidingly connect with the upper cover.

8. The dimmer switch according to claim 7, wherein the button is configured to move the slider to drive an action of the first potentiometer and the second regulating structure comprises a knob configured to drive a rotational action of the second potentiometer.

9. The dimmer switch according to claim 8, wherein the knob further comprises a toothed-shaped piece located on an upper part of the knob, and a connecting rod located below the upper part that is configured to connect with a mounting hole of the second potentiometer.

10. The dimmer switch according to claim 9, wherein an outer contour of the tooth-shaped piece is exposed outside of the shell and the dimmer switch further comprises a baffle plate located on an outer wall of the shell, the baffle plate being located below the tooth-shaped piece, and having an edge that extends beyond the outer contour of the tooth-shaped piece.

* * * * *